UNITED STATES PATENT OFFICE.

MATHILDE RUTTEN, OF LIERRE, BELGIUM.

PROCESS OF STERILIZATION OF VICTUALS.

1,200,651. Specification of Letters Patent. Patented Oct. 10, 1916.

No Drawing. Application filed December 29, 1910. Serial No. 599,900.

*To all whom it may concern:*

Be it known that I, MATHILDE RUTTEN, merchant, a subject of the King of the Belgians, and resident of 25 Avenue du Canal, Lierre, Belgium, have invented a certain new and useful Process of Sterilization of Victuals, of which the following is a specification.

The present invention relates particularly to an economical process for the sterilization of foodstuffs of all kinds and more particularly for the sterilization of bread, biscuits and other similar foodstuffs or products.

Processes are known in which the products to be preserved are placed in tin plate boxes and afterward submitted to a sterilizing process. These processes however are not so practical inasmuch as the packing is very heavy and expensive and because it is almost necessary to supply preserved products packing free.

The present invention has for its object the sterilization and the preservation of the above named products in light packings of easy handling and of a very low cost. These products are packed in a weak container which during the sterilizing is wrapped or held in a temporary protecting receptacle or casing.

According to the invention I use for packing, any suitable substance, metallic or other which would not have owing to its own nature, the resisting power required to stand the effects of sterilization, such as the work of the heat in autoclaves, the pressure of the steam, etc., let it be either a thin cover of tin plate, aluminium or other metal, or cardboard, strawboard, wood pulp, pressed strawboard, celluloid or even paper, macerated paper, or metallic paper, whatsoever, parchment, or waterproof paper rendered water-tight by any process whatever; or any of these materials combined with any cover or metallic layer or strengthened by any varnish, calendering or saturation.

The process consists in the following steps: *a.* The product to be sterilized is first prepared or cooked in a suitable mold or vessel of the same shape as the box or wrapper in which the product is to be preserved. *b.* The cooked product is then *ad libitum* wrapped in a sheet of parchment or other suitable paper which prevents the product acquiring any undesirable odor or taste. *c.* The product so prepared and wrapped in the paper is placed in a suitable box or vessel. *d.* This vessel is then hermetically sealed. *e.* The vessel is then placed in a protecting receptacle in which it fits exactly and which is provided with a movable lid adapted to be closed hermetically, for instance, tin plate box provided with a well-fitting lid and rubber packing. *f.* The whole is then submitted to the action of the heat of sterilization. *g.* When sterilization is completed it is necessary to cool down to lower the pressure to its normal degree. *h.* The vessel is then taken out of its protecting receptacle ready for supply to the market. The air-tight and waterproof character of the vessel can be further insured by dipping in a waterproofing substance or by varnishing.

In placing the vessel containing the product to be sterilized and which is hermetically closed, in a tin box or in a solid form in which the parcel fits exactly and capable of being closed hermetically, I aim at a provisional strengthening of the packing in order that it may withstand the process of sterilization without any injury to itself or damage to the sterilized product.

If desired an opening covered by glass or mica can be provided in the lid or the side of the box in order to make the product visible.

I claim:

1. A process for sterilizing food, consisting in wrapping it in a flexible wrapper, inclosing it in a light receptacle or box, hermetically sealing the latter, then placing it in a protecting container, and heating the container to sterilize the food.

2. A process for sterilizing food, consisting in cooking it, then wrapping it in a flexible wrapper, inclosing it in a light receptacle or box, hermetically sealing the latter, then placing it in a protecting container, heating the container to sterilize the food, and cooling the container and contents before removing the protecting container.

3. A process for sterilizing food, consisting in wrapping it in a wrapper of paper material, inclosing it in a light receptacle or box, hermetically sealing the latter, then placing it in a protecting container, and heating the container to sterilize the food.

4. A process for sterilizing food, consisting in cooking it, then wrapping it in a wrapper of paper material, inclosing it in a light receptacle or box, hermetically sealing the latter, then placing it in a protecting container, and heating the container to sterilize the food.

5. A process for sterilizing food, consisting in cooking it, then wrapping it in a flexible wrapper, inclosing it in a light receptacle or box, hermetically sealing the latter, then placing it in a protecting receptacle, and heating the receptacle to sterilize the food.

6. A process for sterilizing food, consisting in cooking it, then wrapping it in a flexible wrapper, inclosing it in a light receptacle or box, hermetically sealing the latter, then placing it in a protecting container, heating the container to sterilize the food, and cooling the container and contents to normal temperature.

7. A process for sterilizing food, consisting in wrapping it in a flexible wrapper inclosing it in a light receptacle or box, hermetically sealing the latter, then placing it in a protecting container, heating the container to sterilize the food and cooling the container and contents to normal temperature before removing the protecting container.

In testimony whereof I have hereunto signed my name to the specification in the presence of two subscribing witnesses.

MATHILDE RUTTEN.

Witnesses:
ALEX. HUNSPED,
G. DEHERSY.